(12) United States Patent
Dicky

(10) Patent No.: US 7,551,669 B2
(45) Date of Patent: Jun. 23, 2009

(54) SYSTEM FOR MULTIPLEXING INDEPENDENT SIGNALS

(75) Inventor: John Dicky, Dearborn, MI (US)

(73) Assignee: Harman International Industries, Incorporated, Northridge, CA (US)

( * ) Notice: Subject to any disclaimer, the term of this patent is extended or adjusted under 35 U.S.C. 154(b) by 566 days.

(21) Appl. No.: 11/235,698

(22) Filed: Sep. 26, 2005

(65) Prior Publication Data

US 2006/0222089 A1    Oct. 5, 2006

Related U.S. Application Data

(60) Provisional application No. 60/667,751, filed on Apr. 1, 2005.

(51) Int. Cl.
*H03K 7/08* (2006.01)

(52) U.S. Cl. .................. 375/238; 375/259; 340/453

(58) Field of Classification Search .................. 375/259, 375/238; 340/453
See application file for complete search history.

(56) References Cited

U.S. PATENT DOCUMENTS

| | | | |
|---|---|---|---|
| 5,293,628 A | | 3/1994 | Langan et al. |
| 5,905,406 A | * | 5/1999 | Sugden et al. .............. 329/312 |
| 7,126,463 B2 | * | 10/2006 | Bauerle et al. ............. 340/453 |
| 7,369,629 B2 | * | 5/2008 | Umewaka ................... 375/334 |

* cited by examiner

*Primary Examiner*—Chieh M Fan
*Assistant Examiner*—Freshteh N Aghdam
(74) *Attorney, Agent, or Firm*—Brinks Hofer Gilson & Lione

(57) ABSTRACT

A system for multiplexing multiple independent signals includes a transmitter, interconnecting medium, and a receiver. The transmitter encodes a waveform with first and second pieces of information for transmission across the interconnecting medium. The receiver determines the first and second pieces of information using the duty cycle and frequency of the waveform.

24 Claims, 6 Drawing Sheets description, be within the scope of the invention, and be protected by the following claims.

SYSTEM FOR MULTIPLEXING INDEPENDENT SIGNALS

1. PRIORITY CLAIM

This application claims the benefit of priority from U.S. Provisional Application No. 60/667,751, filed Apr. 1, 2005, which is incorporated herein by reference.

BACKGROUND OF THE INVENTION

1. Technical Field

This invention relates to transmitting multiple independent signals. In particular, this invention relates to transmission of unique pieces of information simultaneously over a single transmission channel.

2. Related Art

Systems for multiplexing multiple independent signals are known in the art. Examples include frequency division multiplexing, time division multiplexing, and code-division multiplexing. Frequency division multiplexing (FDM) is a form of signal multiplexing where multiple baseband signals are modulated on different frequency carrier waves and added together to create a composite signal. Time division multiplexing (TDM) is a type of digital multiplexing in which two or more apparently simultaneous channels are derived from a given frequency spectrum, i.e., bit stream, by interleaving pulses representing bits from different channels. Code division multiplexing is a method of multiple access that does not divide up the channel by time (as in TDM), or frequency (as in FDM), but instead encodes data with a certain code associated with a channel and uses the constructive interference properties of the signal medium to perform the multiplexing.

Existing multiplexing methods require significant computational resources to implement, and may not be practical for implementation in an automotive environment where the vehicle head unit experiences competing demands on its processor resources. Therefore, a need exists for a multiplexing system that can provide multiple independent informational signals on a single interconnect while using a small amount of computational resources.

SUMMARY

This invention provides a system for multiplexing independent signals, including a transmitter, an interconnecting medium, and a receiver. The system provides multiplexing capabilities at a reduced computational complexity by encoding a first and second piece of information into one signal using the duty cycle of a waveform for the first piece of information, and the frequency of the waveform for the second piece of information.

The invention also provides a method for multiplexing multiple independent signals including the steps of transmitting an encoded waveform containing first and second pieces of information to a receiver over an interconnecting medium. The transmitter may also send processing information to allow the decoding of the first and second pieces of information in the waveform. The receiver receives the waveform and determines the first and second pieces of information from the waveform using the duty cycle and frequency of the waveform.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
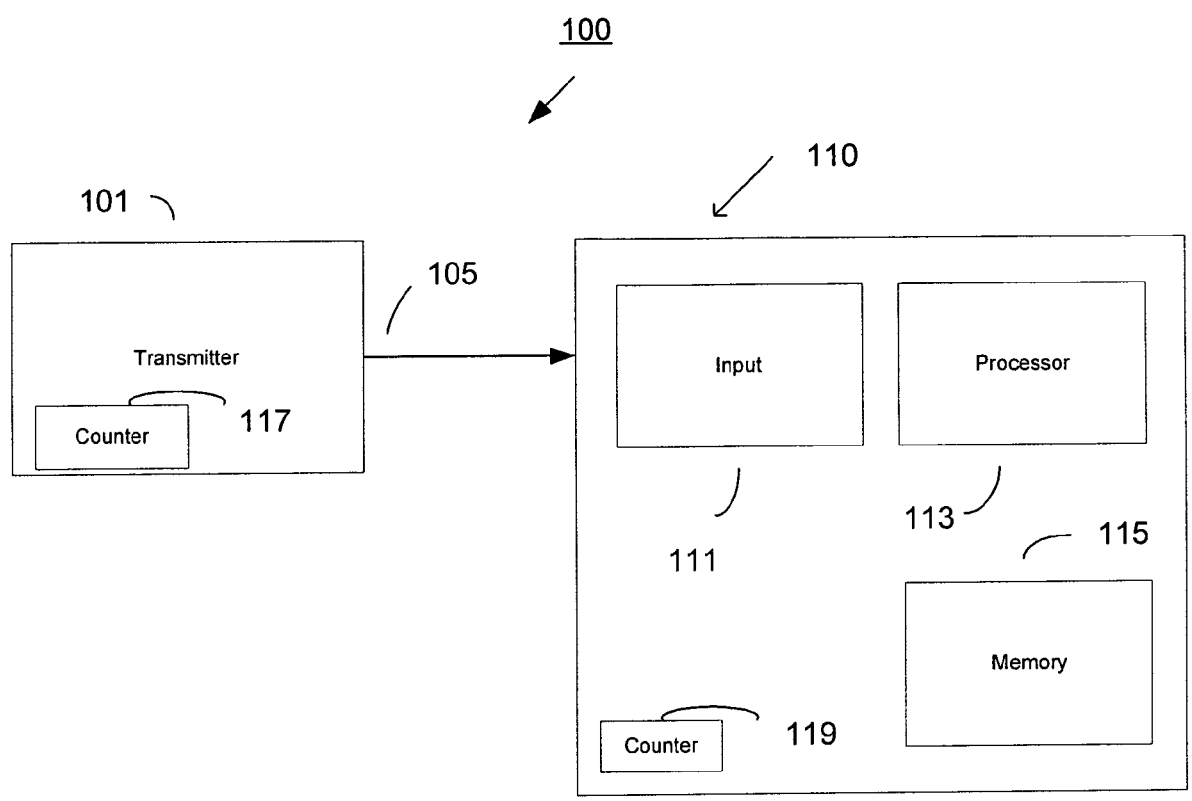
FIG. 1 is a block diagram of a system for multiplexing independent signals.

FIG. 1 illustrates an example system 100 used to encode information transmitted and received using Pulse Width Modulation (PWM) for independent signals. The system 100 uses a Pulse Width Modulation technique applied to a variable frequency waveform. The duty cycle of the waveform may convey one piece of information and the frequency of the same waveform may be used to convey the other, second, piece of information. The duty cycle and frequency of the waveform are changeable and representative of the first and second pieces of information. The system 100 may include a unit for transmitting signals or a transmitter 101, an interconnecting medium 105, and a unit for receiving signals or a receiver 110. The transmitter 101 may include a counter 117. The receiver 110 may include an input unit 111, a processor 113, a memory 115, and a counter 119. The memory 115 may integrate with the processor 113, and/or may communicate with the processor 113 through a wired or wireless interface. The memory 115 may be a volatile or non-volatile electronic memory and/or a magnetic or optical memory. The processor may be a microprocessor, microcontroller, digital signal processor (DSP), application specific integrated circuit, and/or other integrated circuit or device for processing signals. The input unit 111 may pre-process the incoming signal received from the interconnecting medium 105. The input unit 111 may buffer or condition the signal before sending to the processor 113. The input unit 111 may integrate with the processor 113 or may function as a separate unit. The interconnecting medium 105 may be a wired interconnect such as a coaxial, RCA, copper wire, optical interconnect such as fiber optic, or other wired connection, an optical broadcast, an optical interconnect, or an electromagnetic frequency transmission. The interconnecting medium 105 may be a wireless connection, such as an optical broadcast or optical interconnect, WiFi, Bluetooth, microwave, infrared, radio frequency, or other wireless interconnection protocol.

Figure 2:
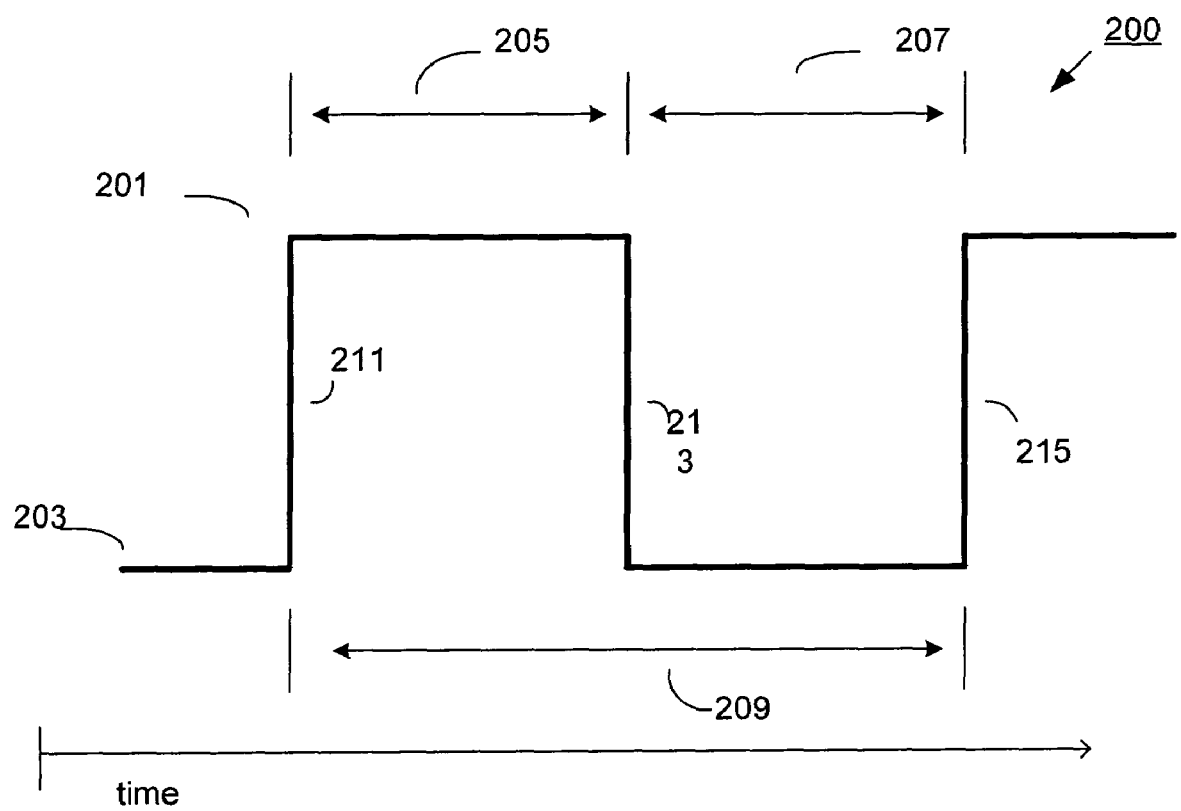
FIG. 2 illustrates a waveform associated with the system.

FIG. 2 illustrates a propagated signal, such as a waveform 200 that may be used to encode information transmitted and received by the system 100. The waveform 200 may be characterized by several parameters that allow encoding and decoding of information in the waveform by the system 100. The waveform 200 may have a logical high value 201, a logical low value 203, an on-time 205, an off-time 207, a total time 209, a first rising edge 211, a first falling edge 213, and a second rising edge 215.

Figure 3:
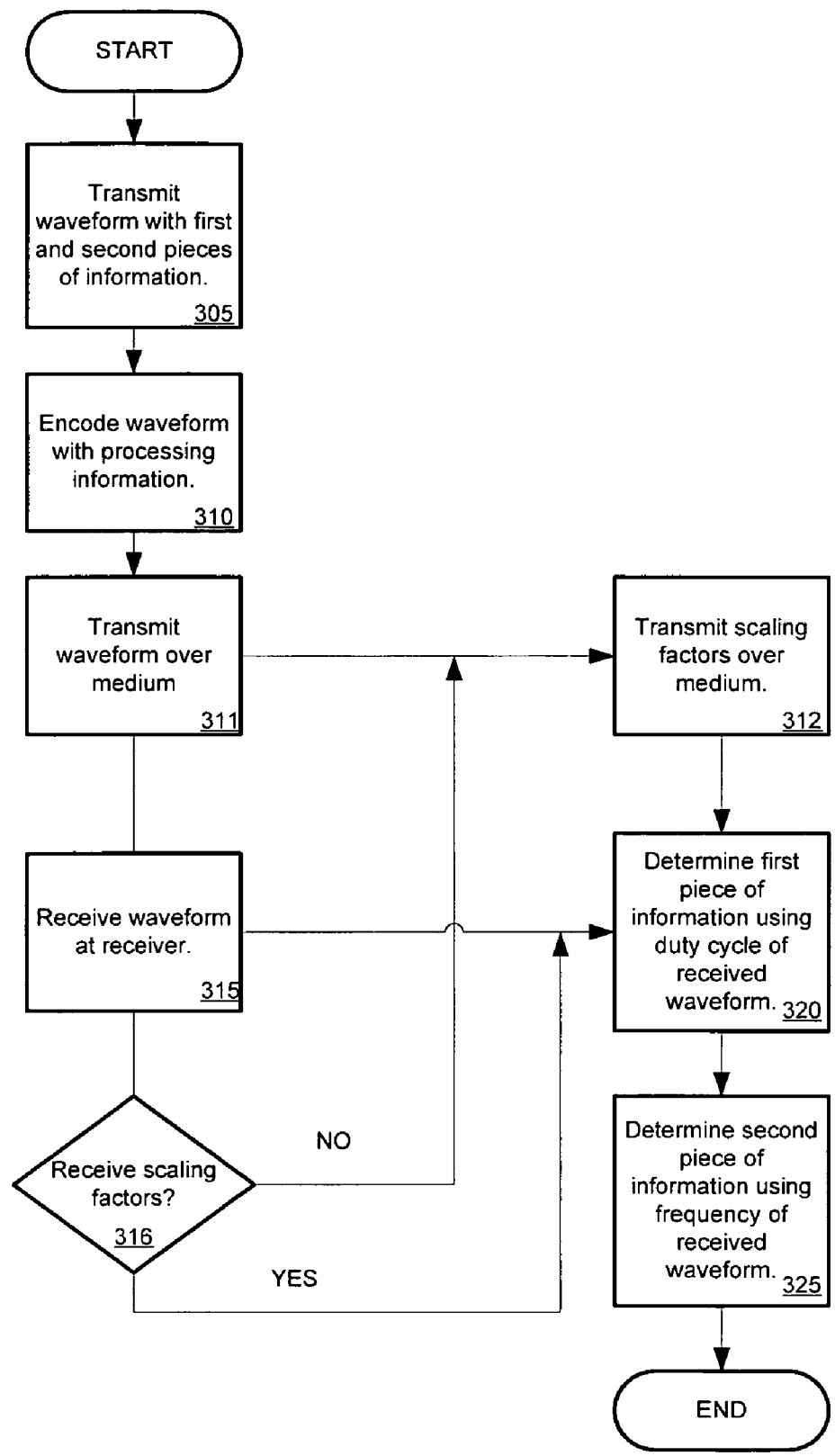
FIG. 3 illustrates multiplexing multiple independent signals.

FIG. 3 is an example operational flow diagram of the system 100 of FIG. 1 describing communication of data in a waveform 200. A transmitter 101 is provided to transmit a waveform containing a first and a second piece of information (act 305). Each of the pieces of information sent by the transmitter 101 may be of a predetermined size, such as one byte, with multiple bit combinations. The first piece of information may be the first byte in a data sequence, while the second piece of information may be the second byte in a data sequence. The transmitter 101 may also encode the waveform 200 with processing information to allow decoding of the waveform 200 at a receiver 110 (act 310). Such processing information may include scaling values which allow calculation of the first and second pieces of information encoded in the waveform. The receiver 110 may be configured to be aware of the scaling method used by the transmitter 101 in order to reconstruct the original information. The transmitter 101 may transmit a first scaling value and a second scaling value to the receiver 110.

The first scaling value provides data that allows decoding of the first piece of information encoded in the waveform 200 received by the receiver 110. The duty cycle of the waveform 200 is established by the first piece of information and the first scaling value through a functional relationship between the two. The first scaling value provides a normalization factor to scale the first piece of information, which may take on any value, to a duty cycle value of the waveform 200 in a range of logical 0 to logical 1. For example, if the range of the first piece of information is 0V to +5V, the first scaling factor would be 5. To calculate the value of the first piece of information, the duty cycle of the received waveform 200 is calculated. Then, the duty cycle is multiplied by the first scaling value to calculate the first piece of information. In the previous example, if a received waveform 200 has a duty cycle of 0.5, then the first piece of information would have a value of 2.5V (0.5*5).

The second scaling value provides data that allows decoding of the second piece of information encoded in the waveform 200 received by the receiver 110. The frequency of the waveform 200 is established by the second piece of information and the second scaling value through a functional relationship between the two. The second scaling value may provide a normalization factor to scale the second piece of information, which may take on any value, to a frequency value of the waveform 200 in the range >0. To calculate the value of the second piece of information, the frequency of the received waveform 200 is calculated. Then, the frequency is multiplied by the second scaling value to calculate the second piece of information. The second scaling value may be set at a value taking into account the frequency range of the transmitter 101 and receiver 110, such as a value of 0.5 or 1.0 for example, where respectively, a value of 1 MHz would encode a second piece of information of value 0.5 or 1. The first and second scaling values may be transmitted in the same waveform 200 with suitable pre-processing information included in the waveform 200 to indicate the presence of the first and second scaling values (act 312). Alternatively, the first and second scaling values may be sent as a separate waveform (not shown), or on a separate line or channel connecting the transmitter 101 and receiver 110.

An interconnecting medium 105 is provided between the transmitter 101 and the receiver 110. The transmitter 101 and receiver 110 need not be directly connected. The system may include intermediary electronics or signal processing elements such as buffers, amplifiers, routers, or other signal processing devices.

The receiver 110 may receive the waveform 200 containing the first and second pieces of information (act 315). At block 316, the receiver 110 may determine if the first and second scaling factors were received. If not, the receiver 110 may prompt the transmitter 101 to transmit the first and second scaling values (act 312). If the first and second scaling values are found present at block 316, the processor 113, included within the receiver 110, may determine the first piece of information from the waveform 200 by using the duty cycle calculated from the received waveform 200 (act 320), as described later. The processor 113 may then determine the second piece of information from the waveform 200 using the frequency calculated from the received waveform 200 (act 325), as described later.

Figure 4:
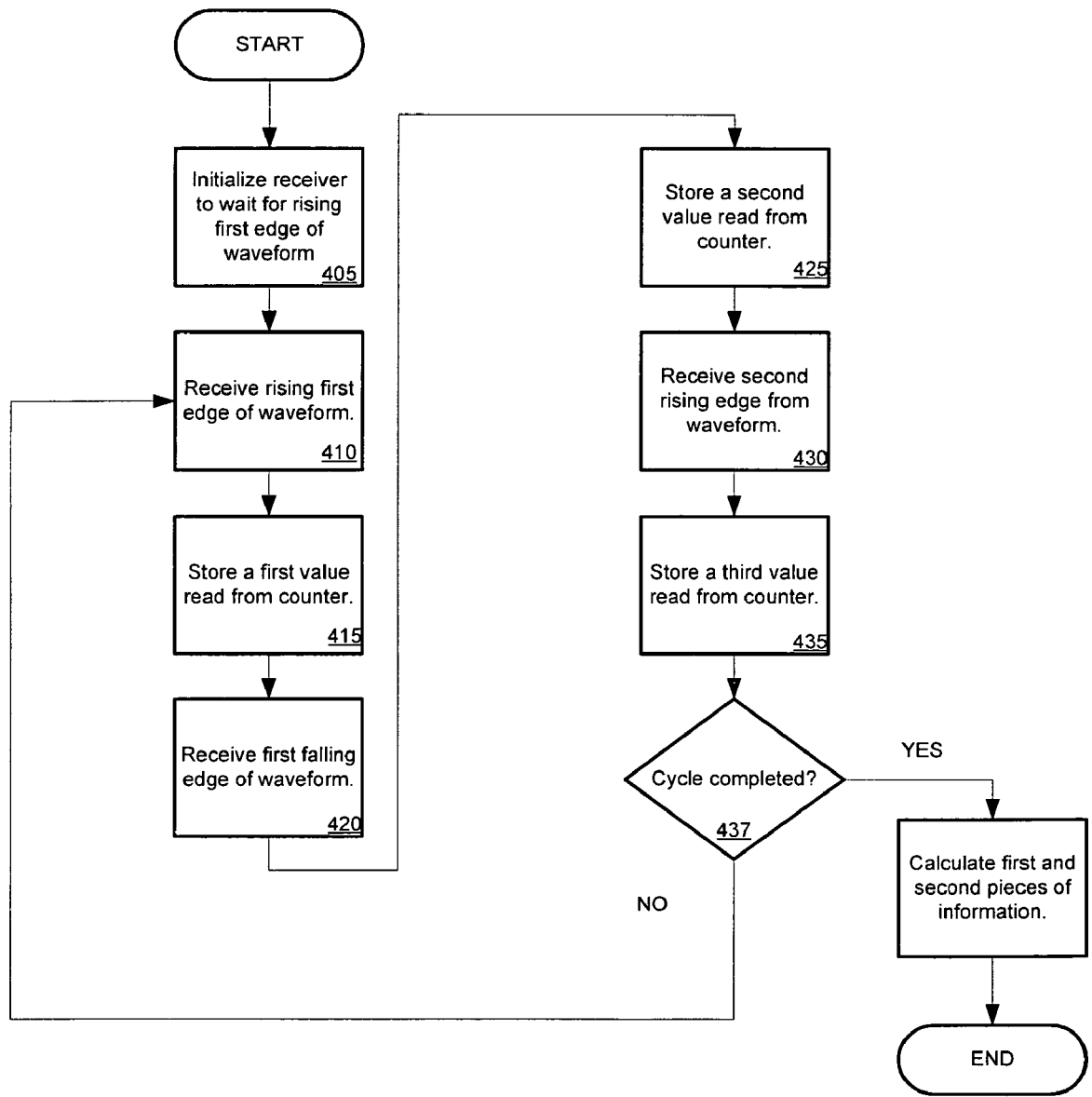
FIG. 4 illustrates acts by the receiver to process a multiplexed waveform.

FIG. 4 is another operational flow diagram of the system 100 of FIG. 1 describing example operation of the receiver 110 to process the waveform 200 before decoding the first and second pieces of information from the waveform 200. The receiver 110 may be initialized prior to receiving the waveform 200 (act 405). The receiver 110 is prepared to receive a first rising edge (211 from FIG. 2). The receiver 110 may receive a first rising edge 211 of the waveform 200 (act 410) and store a first value read from a counter (act 415), indicating the receipt of the first rising edge 211 of the waveform. At block 420, the receiver 110 then may receive a first falling edge of the waveform (213 in FIG. 2). In response to receiving the first falling edge of the waveform 213, the receiver 110 may store a second value read from a counter 119 (act 425). The receiver 110 may then receive a second rising edge 215 of the waveform, indicating the completion of one cycle of the waveform 200 at block 430. The receiver 110 may store a third value read from the counter, in response to receipt of the second rising edge 215 of the waveform (act 435). The receiver 110 may determine if the required number of edges have been detected to complete a cycle, at block 437. For example, the processor 113 may calculate the first and second pieces of information after only one cycle of the waveform, or may buffer the counter readings over several waveform cycles before performing the calculations. If the cycle is not completed, the receiver 110 may prepare to receive a next rising first edge of a waveform to continue the cycle. Otherwise, if the cycle is found to be complete at block 437, the processor 113 may use the stored values from the counter to determine the first and second pieces of information from the waveform 200 (act 440). The values read from the counter in blocks 415, 425, and 435 may be stored in a memory 115.

Figure 5:
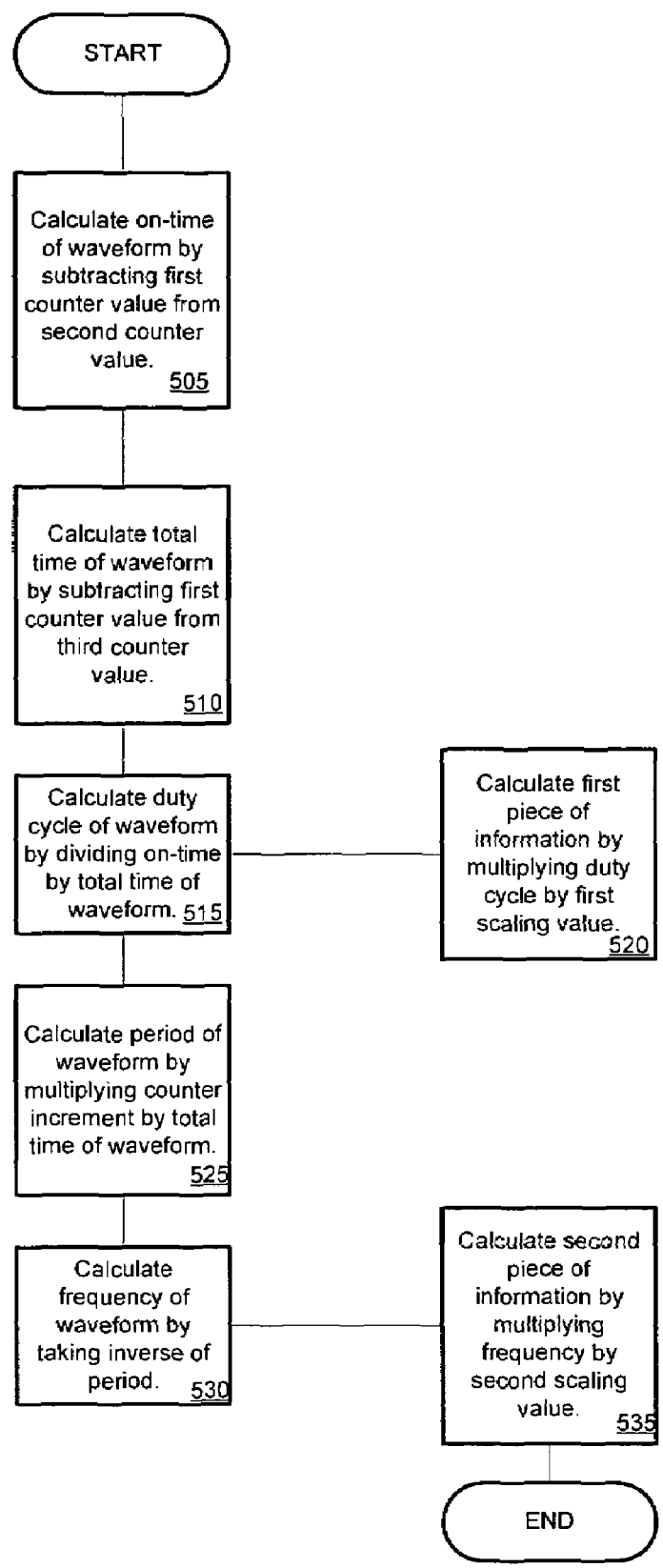
FIG. 5 illustrates acts to determine a first and second piece of information from a multiplexed waveform.

FIG. 5 is an example operational flow diagram for determining the first and second pieces of information 500 that will be described with reference to FIGS. 1 and 2. The processor 113 may calculate an on-time 205 for the received waveform 200 by subtracting the first value, read from the counter 119 and stored in memory 115, from the second value (act 505). The processor 113 may calculate a total time 209 for the received waveform 200 by subtracting the first value read from the counter 119 from the third value read from the counter 119 (act 510). Total cycle time 209 can be either measured directly from the beginning of one cycle to the beginning of the next cycle or by summing the measurements of the on-time 205 and off-time 207 of a single cycle. On-time 205 is the length of time from when a signal transitions into a defined state 201 until it transitions into a different state 203. Off-time 207 is the length of time from the signal transitioning into a defined state 203 until it transitions back into a defined state 201.

The processor 113 may then calculate the duty cycle of the waveform 200 by dividing the on-time 205 calculated in block 505 by the total time 209 calculated in block 510 (act 515). The duty cycle value may be used to determine the first piece of information encoded in the waveform 200. The first piece of information may be determined by multiplying the duty cycle of the waveform 200 by a first scaling value transmitted by the transmitter 101 to indicate the encoding of the waveform 200 (act 520).

The first scaling value provides data that allows decoding of the first piece of information encoded in the waveform 200 received by the receiver 110. The first scaling value provides a normalization factor to scale the first piece of information, which may take on any value, to a duty cycle value of the waveform 200 in a range of logical 0 to logical 1. For example, if the range of the first piece of information is 0V to +5V, the first scaling factor would be 5. To calculate the value of the first piece of information, the duty cycle of the received waveform 200 is calculated. Then, the duty cycle is multiplied by the first scaling value to calculate the first piece of information. In the previous example, if a received waveform 200 has a duty cycle of 0.5, then the first piece of information would have a value of 2.5V (0.5*5).

The processor 113 may calculate the period of the waveform 200 by multiplying a counter increment, read from the counter 119, by the total time 209 of the received waveform 200 calculated in block 510 (act 525). The counter increment may take the form of a clock increment associated with the counter, e.g., each counter increment may represent 1 μs. The frequency of the waveform 200 is determined by taking the inverse of the period (act 530). Information encoded in the waveform 200 may be represented by the frequency of the waveform 200. The second scaling value provides data that allows decoding of the second piece of information encoded in the waveform 200 received by the receiver 110. The second scaling value may provide a normalization factor to scale the second piece of information, which may take on any value, to a frequency value of the waveform 200 in the range >0. To calculate the value of the second piece of information, the frequency of the received waveform 200 is calculated. Then, the frequency is multiplied by the second scaling value to calculate the second piece of information. The second scaling value may be set at a value taking into account the frequency range of the transmitter 101 and receiver 110. For example, the second scaling value may be set at a value such as a value of 0.5 or 1.0, where a value of 1 MHz would encode a second piece of information of 0.5 or 1, respectively. The receiver may then determine the second piece of information encoded in the waveform 200 by multiplying the frequency by a second scaling value transmitted by the transmitter 101 (act 535). Information to be encoded in the PWM duty cycle may be scaled such that its range is greater than zero and less than one. Information to be encoded in the PWM frequency may be scaled such that its minimum value is greater than zero.

Figure 6:
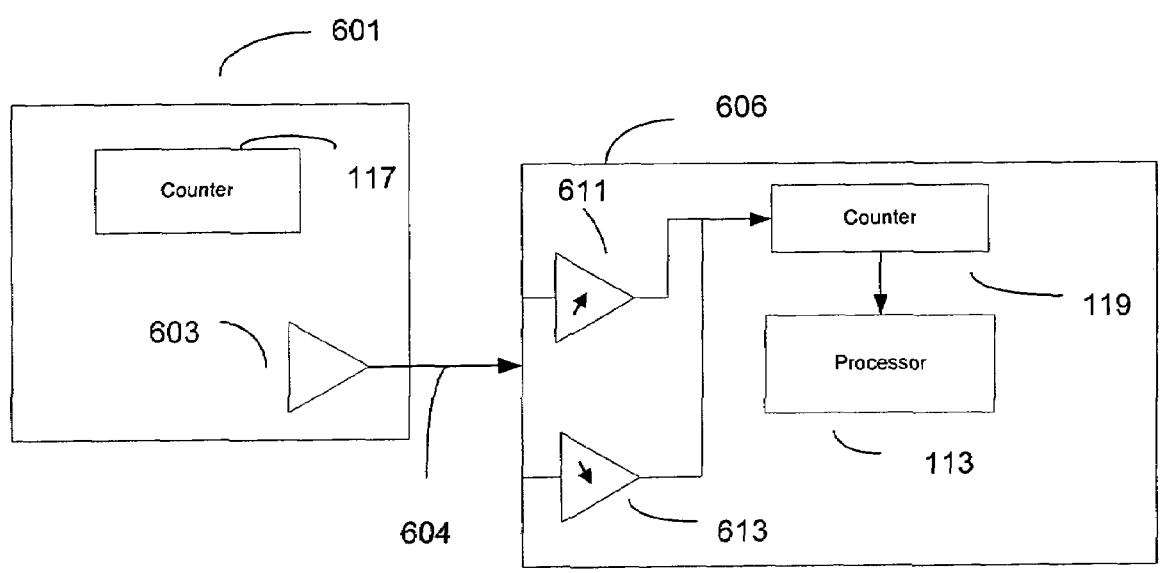
FIG. 6 is a system for multiplexing independent signals from a line driver.

FIG. 6 illustrates an example system with a transmitter unit 601, an interconnecting wire 604 and a receiving unit 606. FIG. 6 shows the system 100 of FIG. 1 with an example data source providing the first and second pieces of information to be transmitted in the waveform 200. The transmitter 601 may include a transmitter counter 117 and a line driver 603 capable of driving the signal 604 into either a determined logical one level, such as a 5 Volt level or a determined logical zero level, such as a 0 Volt level. The defined state of the signal 604 may be greater than a predetermined voltage, such as 2.5 V. The transmitter 601 may send a first type of data and a second type of data, such as a position of a three position switch (not shown) as the first type of data and a wiper resistance of a 100 ohm rheostat (not shown) as the second type of data. The driver 603 may be initialized to drive the signal 604 at the 0V output level. The driver 603 modulates the signal 604 as required to create a PWM waveform 200 on the signal line 604. The driver 603 modulates the signal 604 to create on-time periods of the signal 604 and off-time periods of the signal 604, creating a duty cycle in the signal 604. Prior to the beginning of the cycle, the current position of the three position switch may be determined by the transmitter 601. If the switch is in the first position the duty cycle may be set by the transmitter 601 to be 25%. If the switch is in the second position, the duty cycle may be set by the transmitter 601 to be 50%, and if the switch is in the third position the duty cycle may be set by the transmitter 601 to be 75%. The settings may take on other values for other examples. The resistance may also be measured by the rheostat and communicated to the transmitter 601. The resistance reading may be the second type of data and be represented with a frequency, for example, the frequency may be scaled linearly using the first scaling factor, for example as equal to one hertz per ohm+200 Hz. In this example, if the resistance were 50 ohms the frequency would be 250 Hz. The transmitter counter 117 may be set such that it is incremented at a predetermined interval, such as once every microsecond. The transmitter counter 117 may be implemented with a solid state electronic counter, relay counter, electromechanical counter mechanism, or as component of a microprocessor, microcontroller, or other electronic circuit or device.

If, for example, the switch were in the third position and the resistance of the rheostat was at 50 Ohms then the total cycle time may be calculated by taking the inverse of the 250 Hz, which is 4 ms. The on-time may then be calculated by multiplying the total cycle time by the duty cycle, in this case 4 ms×75%=3 ms. The on-time and total cycle time may be converted to counter count values, resulting in an on count of 3000 and a total cycle count of 4000. At the beginning of the cycle, the driver is set to the 5V output state and the counter is read. When the counter 117 reading is 3000 counts higher than the beginning of the cycle reading, the line driver 603 is set to the 0V output state. When the counter 117 is 4000 counts higher than the beginning of the cycle reading, the cycle is complete and the next cycle starts. Prior to the next cycle starting, readings of the two input signals may be performed and the appropriate calculations may be made as indicated above. The readings of the two input signals may also be buffered in the memory 115 and calculated at a later time.

The receiver 606 may consist of a receiver counter 119, a processor 113, a 0v to 5v rising transition detector 611 and a 5v to 0v falling transition detector 613. Both detectors 611 and 613 may be connected to the signal line 604 that is connected to the line driver 603 in the transmitter 101, and the receiver's counter 609 may increment periodically. During example operation, the receiver 609 may be initialized by waiting for the first rising edge 211 to be detected. As soon as the first rising edge 211 is detected by the receiver 606, the counter 609 may be read and remembered (stored in a memory 115) by the processor 113. As soon as the first falling edge 213 is detected by the receiver 606 after the first rising edge 211, the counter may be read and remembered (stored in a memory 115) by the processor 113. The phase of looking for the second rising edge 115 may then begin. As soon as the next rising edge is detected by the receiver 606, the counter may be read and remembered (stored in a memory 115) by the processor 113 and the cycle is complete.

The on-count may be calculated by the processor 113 by subtracting the count of the first rising edge 211 from the count of the first falling edge 213. The total cycle count may be calculated by the processor 113 by subtracting the count of the first rising edge 211 from the count of the second rising edge 215. The duty cycle may be calculated by the processor 113 by dividing the on-count by the total cycle count. The frequency may be calculated by converting the total cycle count to time by the processor 113 by multiplying the counter increment time by the number of counts and then taking the inverse of the total cycle time to get the PWM frequency. After the calculations are complete, the count of the second rising edge 115 may now be referred to as the count of the first rising edge 111. As soon as the second falling edge (not shown) is detected, the counter 119 may be read and remembered as the time of the first falling edge 111, and the process repeats at the phase of looking for the second rising edge. The count and calculation process may also be performed intermittently at a predetermined cycle rate, such as after every fifth cycle of the waveform 200, during which time the count values may be buffered in the memory 115. The cycle rate for sampling and buffering must correspond to the frequency of change of the waveform 200. For example, if the information contained in the waveform 200 is likely to change every fifth cycle, or is designed to repeat for five cycles at least, then the predetermined cycle rate of sampling could be set at five cycles. If the waveform information is likely to change more frequently, the sampling rate must be increased so that fewer cycles are sampled before the calculations of the first and second pieces of information are performed, to avoid sampling and averaging errors.

After completion of a cycle and its calculations the duty cycle may be converted into the original information by using an inverse scaling method of the duty cycle information in the transmitter, as described above. The frequency may also be converted back to the original information by using an inverse scaling method of the frequency information in the transmitter, as described above.

In the example above, the receiver 606 may receive a signal that was created by the transmitter 601, and the receiver's counter 609 increments one count every microsecond, and that the first rising edge 111 occurs when the counter is at 1500. The first falling edge 113 may occur at a count of 4500 and the second rising edge 115 may occur at a count of 5500. In this example, the on count would be 4500 minus 1500, which is 3000. The total cycle count would be 5500 minus 1500, which is 4000. The duty cycle would be calculated as 3000/4000 or 0.75 or 75%. The frequency may be calculated by multiplying 4000×1 microsecond, for a total cycle time of 4 milliseconds, the inverse of which is 250 Hz. The receiver may then convert the 75% duty cycle to the third switch position and the 250 Hz to 50 Ohms.

Additional applications may include communicating unique information to specific receivers on a multi-receiver network. In this example, a PWM duty cycle of a waveform 200 may include one piece of information to identify one or more receivers. All of the receivers in the network receive the waveform 200. The receivers each calculate the first piece of information to determine if the individual receiver is the intended recipient of the second piece of information also contained in the waveform 200. All the receivers may receive the second piece of information encoded with the PWM frequency, but only the designated receiver will utilize the second piece of information. The PWM frequency of the waveform 200 may include a second piece of information that is the data to be communicated to the selected one or more receivers. The transmission may be multidirectional if a transmitter 101 and receiver 110 are co-located at each node.

The system 100 may also be configured for operation in a vehicle. In the vehicle, an amplifier and a vehicle head unit may be connected by a signal wire. For example, the system 100 may communicate information between a head unit, functioning as a transmitter 101, and an amplifier, functioning as a receiver 110, to implement a "partial mute" of an audio system. In this example, three states of mute operation may be sent from the head unit to the amplifier on the PWM waveform 200. A state of "no mute" may be encoded with a predetermined value of the duty cycle, such as 0-33% duty cycle encoding "no mute." A range of 33%-66% duty cycle may encode "half-mute," and a range of 66%-99% duty cycle may encode a "full mute" operational state. The first scaling value may be used to encode this range so the receiver 110 may decode and calculate the first piece of information. The second piece of information may be the vehicle speed. The transmitter 101 may encode the vehicle speed with a predetermined frequency scale, such as 0 mph corresponding to 100 Hz, and with each additional mph encoded with 1 Hz. In this example, 60 mph would be encoded in the PWM waveform as 160 Hz. Another example within the vehicle may be climate control. The blower speed of the air conditioning unit may be the first piece of information, and the environment mode may be the second piece of information (e.g. whether the doors are open or closed).

Like the methods shown in FIGS. 3-5, the sequence diagrams may be encoded in a signal bearing medium, a computer readable medium such as a memory, programmed within a device such as one or more integrated circuits, or processed by a controller or a computer. If the methods are performed by software, the software may reside in a memory resident to or interfaced to the transmitter 201, the receiver 210, a communication interface, or any other type of non-volatile or volatile memory interfaced or resident to the transmitter 201 or the receiver 210. The memory may include an ordered listing of executable instructions for implementing logical functions. A logical function may be implemented through digital circuitry, through source code, through analog circuitry, or through an analog source such through an analog electrical, audio, or video signal. The software may be embodied in any computer-readable for use by, or in connection with an instruction executable system, apparatus, or device. Such a system may include a computer-based system, a processor-containing system, or another system that may selectively fetch instructions from an instruction executable system, apparatus, or device that may also execute 30 instructions.

A "computer-readable medium," and/or "machine-readable medium," may comprise any means that contains,or stores, software for use by or in connection with an instruction executable system, apparatus, or device. or semiconductor system, apparatus, device, or propagation medium. A non-exhaustive list of examples of a machine-readable medium would include: a portable magnetic or optical disk, a volatile memory such as a Random Access Memory "RAM" (electronic), a Read-Only Memory "ROM" (electronic), an Erasable Programmable Read-Only Memory (EPROM or Flash memory) (electronic).

The application provides a convenient system 100 to multiplex two independent signals using pulse width modulation. Using fundamental properties of a PWM waveform, two pieces of information may be communicated within a network of transmitters and receivers. The information may be decoded and utilized in different environments, such as automobile control environments, or other sensing and control applications, without requiring extensive hardware or computational resources.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method for communicating data in a waveform comprising:
   encoding a waveform comprising a first piece of information represented with a duty cycle of the waveform and a second piece of information represented with a frequency of the same waveform, where an identifier is represented with one of the first piece of information or the second piece of information, and data is represented with an other of the first piece of information or the second piece of information:
   transmitting the waveform, a first scaling value, and a second scaling value over a network to a plurality of receivers;
   receiving the waveform, the first scaling value, and the second scaling value; decoding one of the duty cycle or the frequency of the received waveform with the first scaling value to determine the identifier from the first piece of information or the second piece of information, respectively; and
   the receivers identified by the determined identifier decoding another of the duty cycle or the frequency of the received waveform with the second scaling value to determine the data from the first piece of information or the second piece of information, respectively.

2. A system for communicating data in a waveform comprising:
   a transmitter to transmit a propagated signal encoded with machine-readable information comprising a first piece of information scaled with a first scaling value to be represented with a duty cycle of the waveform; and a second piece of information scaled with a second scaling value to be represented with a frequency of the same waveform, where an identifier is represented with one of the first piece of information or the second piece of information, and data is represented with an other of the first piece of information the second piece of information;
   a plurality of receivers configured to receive the propagated signal, where the receivers calculate the first piece of information from the duty cycle of the received waveform and the first scaling value used to encode the first piece of information and calculate the second piece of information from the frequency of the received waveform and the second scaling value, where each of the receivers first calculate to determine the identifier and then calculate to determine the data in response to being identified with the determined identifier; and
   an interconnecting medium over which the propagated signal is transmittable, where the interconnecting medium enables communication between the transmitter and the receivers.

3. An apparatus for communicating data in a waveform comprising:
   means for transmitting a waveform comprising a first piece of information represented with a duty cycle of the waveform and a second piece of information represented with a frequency of the same waveform;
   a plurality of means for receiving the first piece of information and the second piece of information, where the means for transmitting communicates information to one or more means for receiving on a multi-receiver network; and
   a processor to calculate the first piece of information from the duty cycle of the received waveform and a first scaling value used to encode the first piece of information, where the processor calculates the second piece of information from the frequency of the received waveform and the second scaling value, where one of the first piece of information or the second piece of information identifies at least one of the plurality of means for receiving, and where an other of the first piece of information or the second piece of information is data communicated to the identified at least one of the plurality of means for receiving.

4. The method of claim 1 where the first piece of information is scaled by a first scaling value to determine the duty cycle of the waveform, and the second piece of information is scaled by a second scaling value to determine the frequency of the waveform.

5. The apparatus of claim 3 where the first piece of information is scaled by a first scaling value to determine the duty cycle of the waveform, and the second piece of information is scaled by a second scaling value to determine the frequency of the waveform.

6. The system of claim 2 where the waveform comprises one or more cycles and where the first piece of information is scaled by a first scaling value to determine the duty cycle of the waveform, and the second piece of information is scaled by a second scaling value to determine the frequency of the waveform.

7. The system of claim 2, where the duty cycle has total time consisting essentially of only one on-time, and only one off-time.

8. The system of claim 7 where the on-time is a length of time measured from when the waveform transitions into a defined state until the waveform transitions out of the defined state.

9. The system of claim 7 where the off-time is a length of time measured from the waveform transitioning out of a defined state until the waveform transitions back into the defined state.

10. The system of claim 7 where the total time is either measured directly from the beginning of a first cycle to the beginning of a next second cycle or by summing the measurements of the on-time and off-time of a single cycle.

11. The system of claim 2 where the receiver further comprises a counter and a plurality of transition detectors configured to detect a rising edge of the waveform and a falling edge of the waveform.

12. The system of claim 2 where the interconnecting medium comprises at least one of a wired interconnect, an optical broadcast, an optical interconnect, or an electromagnetic frequency broadcast, or combinations thereof.

13. The method of claim 1 where receiving comprises:
   receiving the waveform with a receiver that comprises a counter, a processor, and a memory;
   storing in the memory a first value read from the counter in response to receipt of a first rising edge of the waveform;
   storing in the memory a second value read from the counter in response to receipt of a first falling edge of the waveform with the receiver; and
   storing in the memory a third value read from the counter in response to receipt of a second rising edge of the waveform with the receiver.

14. The method of claim 13 further comprising:
calculating, with the processor, an on-time of the duty cycle by subtraction of the first value from the second value;
calculating, with the processor, a total time of the duty cycle by subtraction of the first value from the third value;
calculating, with the processor, the duty cycle by division of the on-time by the total time;
calculating, with the processor, a period by multiplication of a counter increment time by the total time; and
calculating, with the processor, the frequency from the inverse of the period.

15. The apparatus of claim 3 where the processor is further configured to calculate an on-time of the duty cycle and a total time of the duty cycle.

16. The apparatus of claim 3 where the processor is further configured to calculate the period and the frequency of the waveform.

17. The method of claim 1 where the first piece of information is a first byte of a data sequence, and the second piece of information is a second byte of a data sequence.

18. The system of claim 2 where the system is configured for use in a vehicle.

19. The system of claim 18 where the first piece of information is a vehicle parameter, and the second piece of information is an operational mode of the vehicle.

20. A computer program product comprising:
a computer useable medium having computer readable code embodied in the medium, the computer readable code comprising:
computer readable code executable to transmit a waveform comprising a first piece of information represented with a duty cycle of the waveform, and a second piece of information represented with a frequency of the same waveform, where one of the first piece of information or the second piece of information is an identifier. and an other of the first piece of information or the second piece of information is data;
computer readable code to receive the waveform;
computer readable code to calculate the first piece of information from the duty cycle of the received waveform;
computer readable code to calculate the second piece of information from the frequency of the received waveform; and
computer readable code to determine if the identifier is recognized and computer readable code to determine the data in response to determination that the identifier is recognized.

21. A system for communicating data in a waveform comprising:
a transmitter to transmit a propagated signal, for receipt by a plurality of receivers, where the propagated signal is encoded with machine-readable information comprising a first piece of information represented with a duty cycle of the waveform and a second piece of information represented with a frequency of the same waveform, where the waveform comprises one or more cycles, and where the duty cycle of the waveform is established by the first piece of the information and a first scaling factor, and the frequency of the waveform is established by the second piece of information and a second scaling factor, and where the transmitter includes data represented as one of the first piece of information or the second piece of information for at least one of the receivers identified with an identifier represented in an other of the first piece of information or the second piece of information.

22. A system for communicating data in a waveform comprising:
a plurality of receivers to receive a propagated signal, where the propagated signal is encoded with machine-readable information comprising a first piece of information represented with a duty cycle of the waveform and a second piece of information represented with a frequency of the same waveform, where the waveform comprises one or more cycles, and where the first piece of information is calculated with the duty cycle of the waveform and a first scaling factor, and the second piece of information is calculated by the frequency of the waveform and a second scaling factor, and
where at least one of the receivers identified with an identifier represented with one of the first piece of information or the second piece of information is enabled to calculate data from an other of the fist piece of information or the second piece of information.

23. The system of claim 2, where the identifier is represented with the first piece of information and the data is represented with the second piece of information.

24. The system of claim 2, where the identifier is represented with the second piece of information and the data is represented with the first piece of information.

* * * * *

UNITED STATES PATENT AND TRADEMARK OFFICE
CERTIFICATE OF CORRECTION

PATENT NO. : 7,551,669 B2 Page 1 of 1
APPLICATION NO. : 11/235698
DATED : June 23, 2009
INVENTOR(S) : John Dicky It is certified that error appears in the above-identified patent and that said Letters Patent is hereby corrected as shown below:

In the Claims:

In column 9, line 43, please insert --or-- after --information--.

In column 11, line 32 please delete "executable" after --code--.

Signed and Sealed this

Eleventh Day of August, 2009

David J. Kappos
*Director of the United States Patent and Trademark Office*